United States Patent
Kirkland et al.

(10) Patent No.: US 8,849,920 B2
(45) Date of Patent: Sep. 30, 2014

(54) MANAGEMENT OF BROADCAST-DISTRIBUTED DATA ENTITIES

(75) Inventors: Dustin C. Kirkland, Austin, TX (US); Ameet M. Paranjape, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 11/673,093

(22) Filed: Feb. 9, 2007

(65) Prior Publication Data

US 2008/0195708 A1     Aug. 14, 2008

(51) Int. Cl.
  *G06F 15/16*    (2006.01)
  *H04L 12/58*    (2006.01)
  *G06Q 10/10*    (2012.01)

(52) U.S. Cl.
  CPC .............. *G06Q 10/107* (2013.01); *H04L 12/58* (2013.01); *H04L 51/22* (2013.01)
  USPC .......................................... 709/206; 709/207

(58) Field of Classification Search
  CPC ................................ H04L 12/58; H04L 51/22
  USPC .......................................................... 709/206
  See application file for complete search history.

(56) References Cited

U.S. PATENT DOCUMENTS

| | | | | |
|---|---|---|---|---|
| 6,804,704 | B1 * | 10/2004 | Bates et al. .................... | 709/217 |
| 7,024,457 | B1 * | 4/2006 | Newman et al. ............... | 709/206 |
| 7,895,271 | B1 * | 2/2011 | Malik ............................ | 709/206 |
| 7,945,600 | B1 * | 5/2011 | Thomas et al. ................ | 707/804 |
| 2002/0016818 | A1 * | 2/2002 | Kirani et al. ................... | 709/203 |
| 2002/0059384 | A1 * | 5/2002 | Kaars ............................ | 709/206 |
| 2002/0077846 | A1 * | 6/2002 | Bierbrauer et al. ............... | 705/1 |
| 2002/0112008 | A1 * | 8/2002 | Christenson et al. .......... | 709/206 |
| 2003/0055907 | A1 * | 3/2003 | Stiers ............................ | 709/206 |
| 2003/0105716 | A1 * | 6/2003 | Sutton et al. ..................... | 705/50 |
| 2004/0133599 | A1 * | 7/2004 | Warren et al. .............. | 707/104.1 |
| 2004/0186894 | A1 * | 9/2004 | Jhingan et al. ................. | 709/207 |
| 2005/0283461 | A1 * | 12/2005 | Sell et al. .......................... | 707/1 |

* cited by examiner

*Primary Examiner* — Rupal Dharia
*Assistant Examiner* — Joe Chacko
(74) *Attorney, Agent, or Firm* — Yudell Isidore Ng Russell PLLC; Matthew Baca

(57) ABSTRACT

A method, computer program product, and data processing system for reducing the storage needed for broadcast-distributed data entities, such as electronic mail messages from a mailing list, are disclosed. Locally stored data entities that are determined to have corresponding copies elsewhere are replaced with identifying information to allow the corresponding copies to be retrieved. In a preferred embodiment, locally-stored electronic mail messages in an electronic mail server that are determined to come from archived mailing lists are replaced periodically with one or more URLs (Uniform Resource Locator) of archived copies of the message. When a request from a mail client to download the electronic mail message is received, the message is reconstructed from the archived copy and returned to the client, rather than being retrieved from local storage.

19 Claims, 4 Drawing Sheets

MANAGEMENT OF BROADCAST-DISTRIBUTED DATA ENTITIES

BACKGROUND OF THE INVENTION

1. Technical Field

The present invention relates generally to data storage, and more specifically to the storage of bulk electronic mail messages and other data entities broadcast as multiple copies.

2. Description of the Related Art

Electronic mail has long been known to be a convenient medium for sending a message to multiple recipients. Even before the mass commercialization of the Internet in the mid-late 1990s, it was common for Internet users to subscribe to automated mailing lists for the purpose of conducting round-table discussions or distributing newsletters through electronic mail. In one of these mailing list systems, an electronic mail message sent to a designated mailing list address is duplicated and sent out to all of the users subscribed to the mailing list. A number of mailing list management programs exist for this purpose, such as the popular "LISTSERV" and "Majordomo" software packages. The programs take care of the subscription (and unsubscription) of users, distribution of messages to subscribers, and archival of list messages. Often a mailing list will post its archive on the Internet in the form of a web page to allow previous messages to be browsed or searched. With the rapid expansion of the Internet into businesses and homes, the electronic mail messages transmitted on a daily basis has grown at an astonishing rate. Not surprisingly, many of these messages are mass mailings, such as newsletters, mailing list discussions, and advertisements.

Because electronic mail is a person-to-person or point-to-point communications medium, each recipient of an electronic mail message receives an individual copy of the message at his/her local electronic mail server, where the message is stored at least until it is retrieved by the user using an electronic mail client, such as LOTUS NOTES or MICROSOFT OUTLOOK. In many instances, an electronic mail server will continue to store the message until the user deletes it, even if the message has been read by the user, thus allowing the user to have access to his/her entire mailbox of messages from any location (by storing them in a central repository). Typically, a single electronic mail server will serve a number of users, and in a large organization, the number of such users may be quite high. A tremendous amount of storage may be required to store messages for that large a number of users.

For mass-distributed messages, this problem is compounded even further, as multiple users of a single electronic mail server may each have a copy of a single message. In the case of "junk mail" messages or "spam," some electronic mail systems apply a "spam filter" to delete or discard received spam. Spam filters can be a convenience for users, but are not an effective solution to the message storage problem, as many (if not most) mass-distributed messages are not spam and cannot simply be automatically deleted.

What is needed, therefore, is a method for reducing the storage burden of electronic mail systems and other similar software systems having a broadcast or multicast capability. The present invention provides a solution to this and other problems, and offers other advantages over previous solutions.

SUMMARY OF THE INVENTION

Accordingly, the present invention provides a method, computer program product, and data processing system for reducing the storage needed for broadcast-distributed data entities, such as electronic mail messages from a mailing list, for example. Locally stored data entities that are determined to have corresponding copies elsewhere are replaced with identifying information to allow the corresponding copies to be retrieved. In a preferred embodiment, locally-stored electronic mail messages in an electronic mail server that are determined to come from archived mailing lists are replaced periodically with one or more URLs (Uniform Resource Locator) of archived copies of the message. When a request from a mail client to download the electronic mail message is received, the message is reconstructed from the archived copy and returned to the client, rather than being retrieved from local storage.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
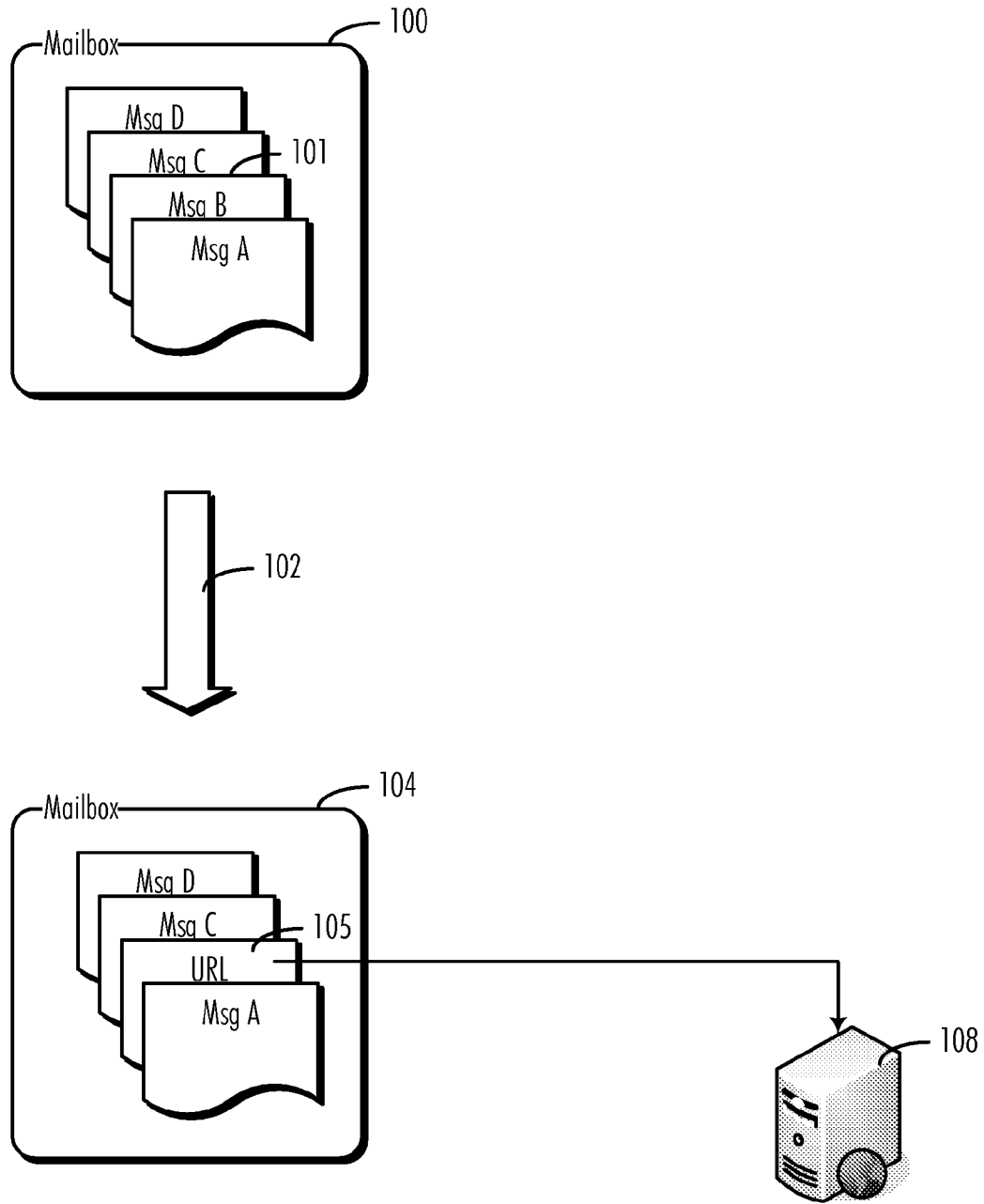
FIG. 1 is a diagram illustrating the basic operation of a preferred embodiment of the present invention.

FIG. 1 is a diagram illustrating the basic operation of a preferred embodiment of the present invention. This preferred embodiment of the present invention is implemented in the form of an electronic mail server, which receives electronic mail messages and stores the messages for subsequent retrieval by an electronic mail client program. Each user of the electronic mail server has a mailbox (e.g., mailbox 100 in FIG. 1), in which all of that user's messages are stored (e.g., message 101 in FIG. 1, which is stored in mailbox 100).

According to a preferred embodiment of the present invention the mail server periodically performs a storage compaction operation 102 on each mailbox. Compaction operation 102 (depicted in flowchart form in FIG. 2) replaces messages that are known to have one or more other copies existing elsewhere with identifying information sufficient to locate and retrieve one of the copies. In FIG. 1, this is shown for mailbox 100 by replacing mailbox 100 with mailbox 104, the compacted version of mailbox 100. Mailbox 104 contains all of the same messages as mailbox 100, except that message 101 has been replaced with the uniform resource locator (URL) 105 of a copy of message 101 existing on web server 108. When the user of mailbox 104 subsequently attempts to retrieve message 101 from the mail server, the mail server uses URL 105 to retrieve the copy of message 101 from web server 108 and then returns the copy to the user. Thus, message 101 may still be downloaded from the mail server by a mail client, but it is not necessary for the mail server to actually maintain a copy of the message itself.

There are several different ways that the mail server can know that a given message, such as message 101, has a corresponding copy existing elsewhere. If message 101 comes from an electronic mail mailing list that maintains an archive of its messages at a particular location on the Internet, the electronic mail server can replace the locally-stored message with the location of the archive (or of the message as stored in the archive) on the Internet. A user subscribed to a particular mailing list or an administrator of the mail server can instruct the server that messages originating from the mailing list's address are archived and the location of the archive(s) for that list.

Alternatively, the electronic mail server can actually discover the existence and location of an archived copy of the message. The mail server invokes and Internet search engine or a suitable web service to conduct a brief search for an archived copy of the message on the Internet, by using statistically improbable words or phrases from the original message as the search query in the search engine. The mail server then compares the results of the search with the original message to determine if it has found a match.

At this point, some clarification of the term "copy," as it is used in this document, is necessary. "Copy" in the present context does not necessarily denote a "byte-for-byte" verbatim copy of a message. Rather, this document uses the term "copy" to denote a message or other data entity in which the content intended for human consumption is essentially the same as that of the original. For instance, a "copy" may be in a different format (such as a web page with graphics and fonts, as opposed to ASCII text without graphics or fonts) or contain different mail headers (or no mail headers), while still containing the same essential human-intended content. Indeed, in the case of a web-archived electronic mail message, an archived copy will typically contain web links for navigating from message to message within the archive, which are not present in the original message, and will not contain mail headers.

Figure 2:
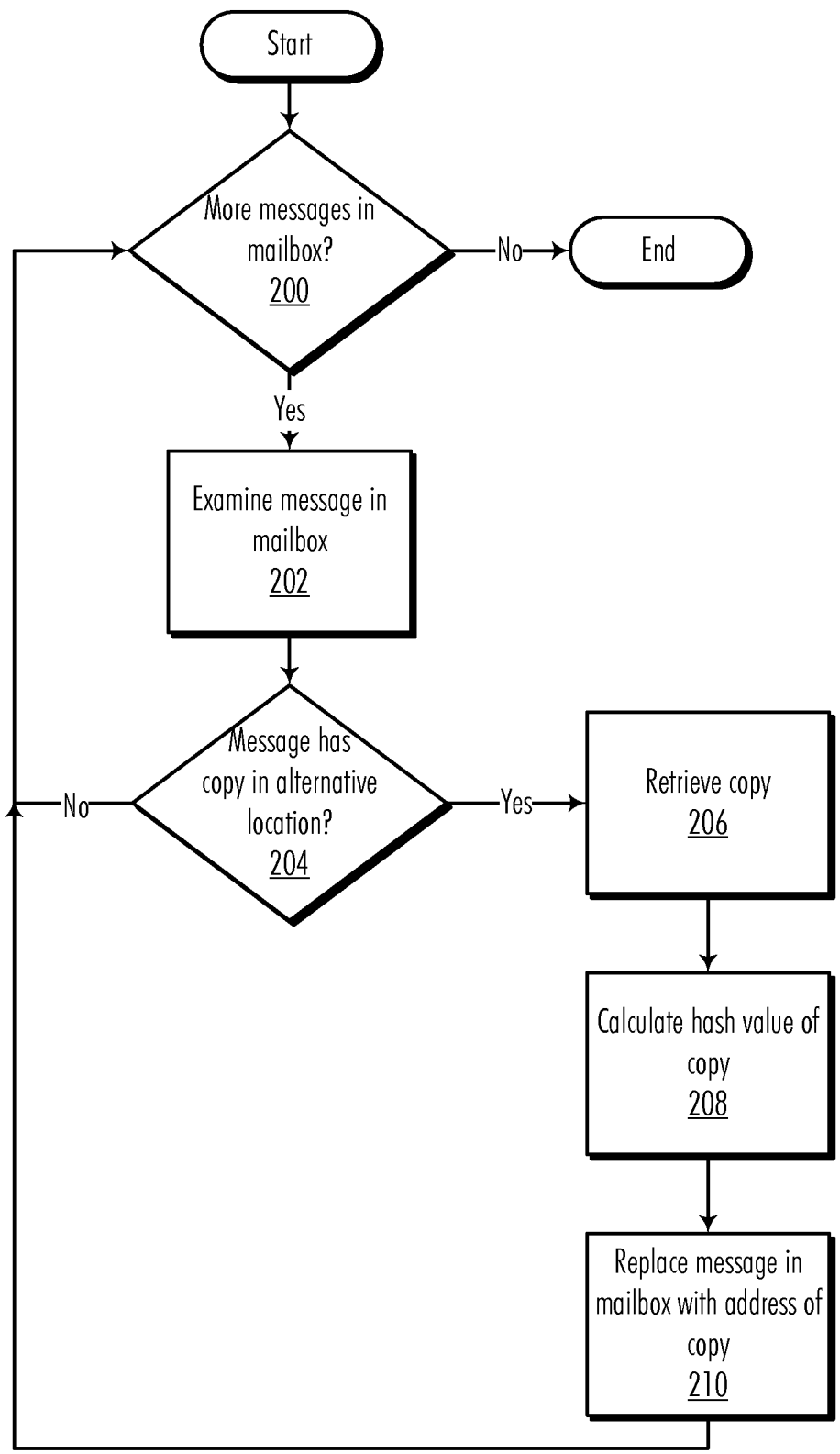
FIG. 2 is a flowchart representation of a process of replacing electronic mail messages with addresses to their archive locations in accordance with a preferred embodiment of the present invention.

FIG. 2 is a flowchart representation of a process of replacing electronic mail messages with addresses to their archive locations in a mail server made in accordance with a preferred embodiment of the present invention. This process will be preferably executed on each user's mailbox periodically to compact the size of the mailbox. While there are remaining messages in the mailbox to be considered for possible replacement (block 200:Yes), the next message in the mailbox is examined (block 202).

Next, a determination is made as to whether the message has a corresponding copy in another location (block 204). This determination may be made by a number of different methods, including those described previously in this document (i.e., by detecting that the message originates from a known archived mailing list, by using a search engine to discover a copy, by locating the same message in another user's mailbox, etc.). If such a copy does not exist (block 204:No), the process cycles to block 200 to determine if there are any remaining messages in the mailbox to consider for replacement.

If, on the other hand, a copy does exist (block 204:Yes), that copy is retrieved from its location (block 206) and a hash function (such as the MD5 message digest algorithm, for example) is applied to the retrieved copy to obtain a hash value for the copy (block 208). This hash value will be used to verify the integrity of the copy during subsequent retrieval(s) of the message, so that any subsequent modification or deletion of the copy can be detected. The address (location) of the copy and the computed hash value are then stored in the user's mailbox in place of the original message (block 210). The stored address and hash value constitute identifying information that will be used to retrieve the copy of the message for a mail client, as described in FIG. 3.

Figure 3:
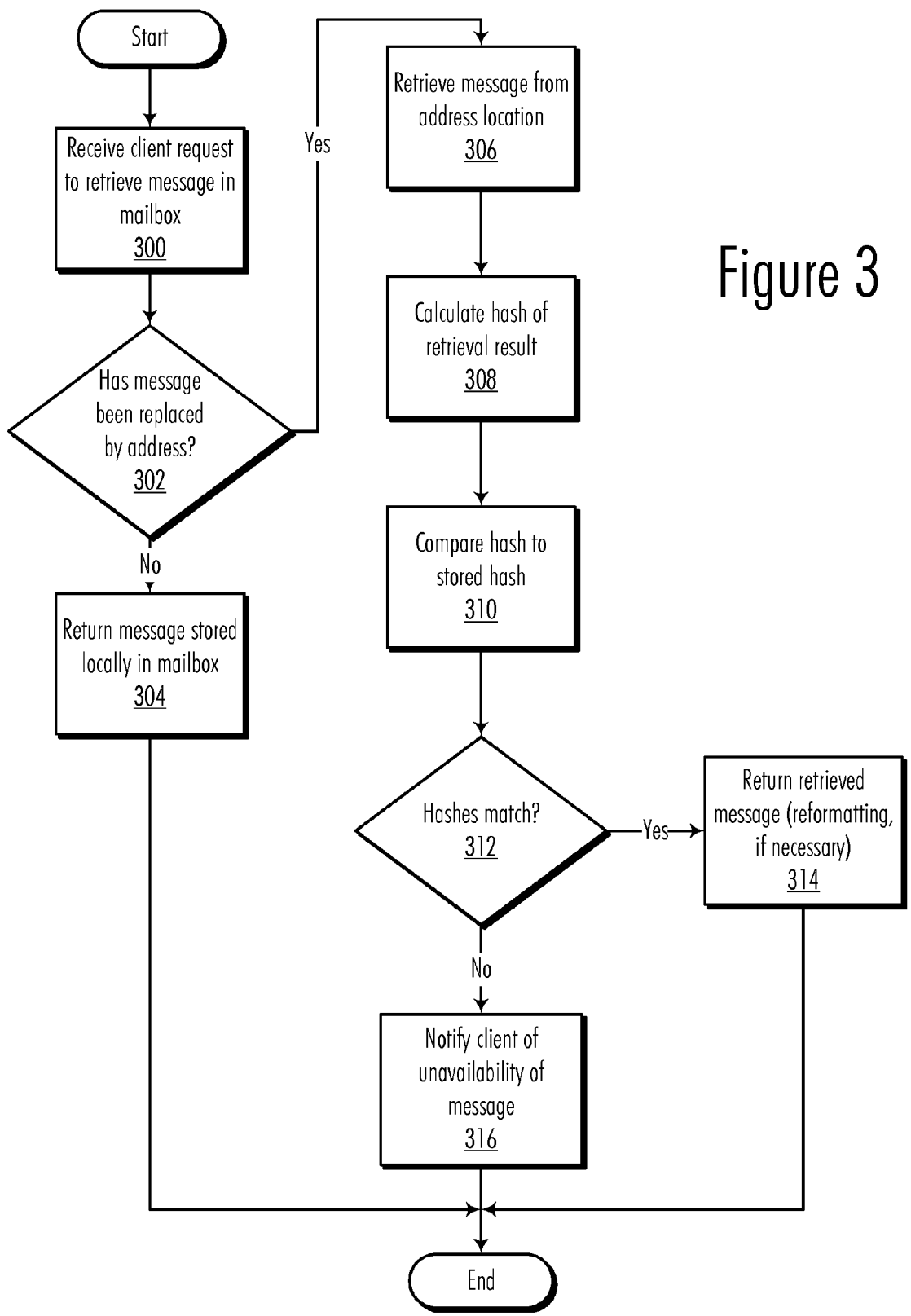
FIG. 3 is a flowchart representation of a process of retrieving an electronic mail message in accordance with a preferred embodiment of the present invention.

FIG. 3 is a flowchart representation of a process of retrieving an electronic mail message in an electronic mail server made in accordance with a preferred embodiment of the present invention. Upon receiving a request from a mail client to retrieve/download a particular electronic mail message (block 300), the mail server first determines whether the message is stored locally in the client user's mailbox or if the message has been replaced by the address (or addresses) of a copy of the message (block 302). If the message is stored locally (block 302:No), then the locally stored message is simply returned to the client (block 304) and the process terminates.

If, on the other hand, the message has been replaced with the address of an archived copy (block 302:Yes), then this address is used retrieve the copy from its location (block 306). Next, the hash function value of the retrieved copy is computed (block 308) and this value is compared to the hash value stored locally in the client user's mailbox (block 310). If the hash values match (block 312:Yes), then the retrieved copy is determined to be a correct copy of the original message. The electronic mail server then returns the retrieved copy to the client that originally requested it, reformatting the message into an acceptable form for reception by the client, as necessary (block 314). For example, if the retrieved copy is in the form of a web page, it may be necessary to append mail protocol headers to the copy before returning the copy to the client, so that the client can process the copy as it would for an ordinary electronic mail message.

On the other hand, if the hash values do not match, a message is returned to the client indicating that the message is unavailable (block 316). Alternatively, if addresses of multiple archived copies of the message are available, the process can be repeated from block 306 for each of these addresses until either a matching hash value is obtained or all addresses have been used.

One skilled in the art will recognize that a number of notable variations on the present invention are possible, some of which are discussed here. For instance, one skilled in the art will recognize that while the preferred embodiment described above is implemented in an electronic mail server, it is also equally possible to replace locally-stored messages with the addresses of remote copies in an electronic mail client, so as to reduce the size of a user's local client mailbox.

Further, the teachings of the present invention may be generalized to other problem domains where redundant copies of messages, files, or other data entities frequently occur. For example, the teachings of the present invention may be applied to an operating system to enable the operating system to periodically search for redundant copies of certain kinds of files (such as read-only files, for example) and replace those redundant copies with identifying information pointing to a single local copy of the file or to one or more remotely-stored copies of the file.

Figure 4:
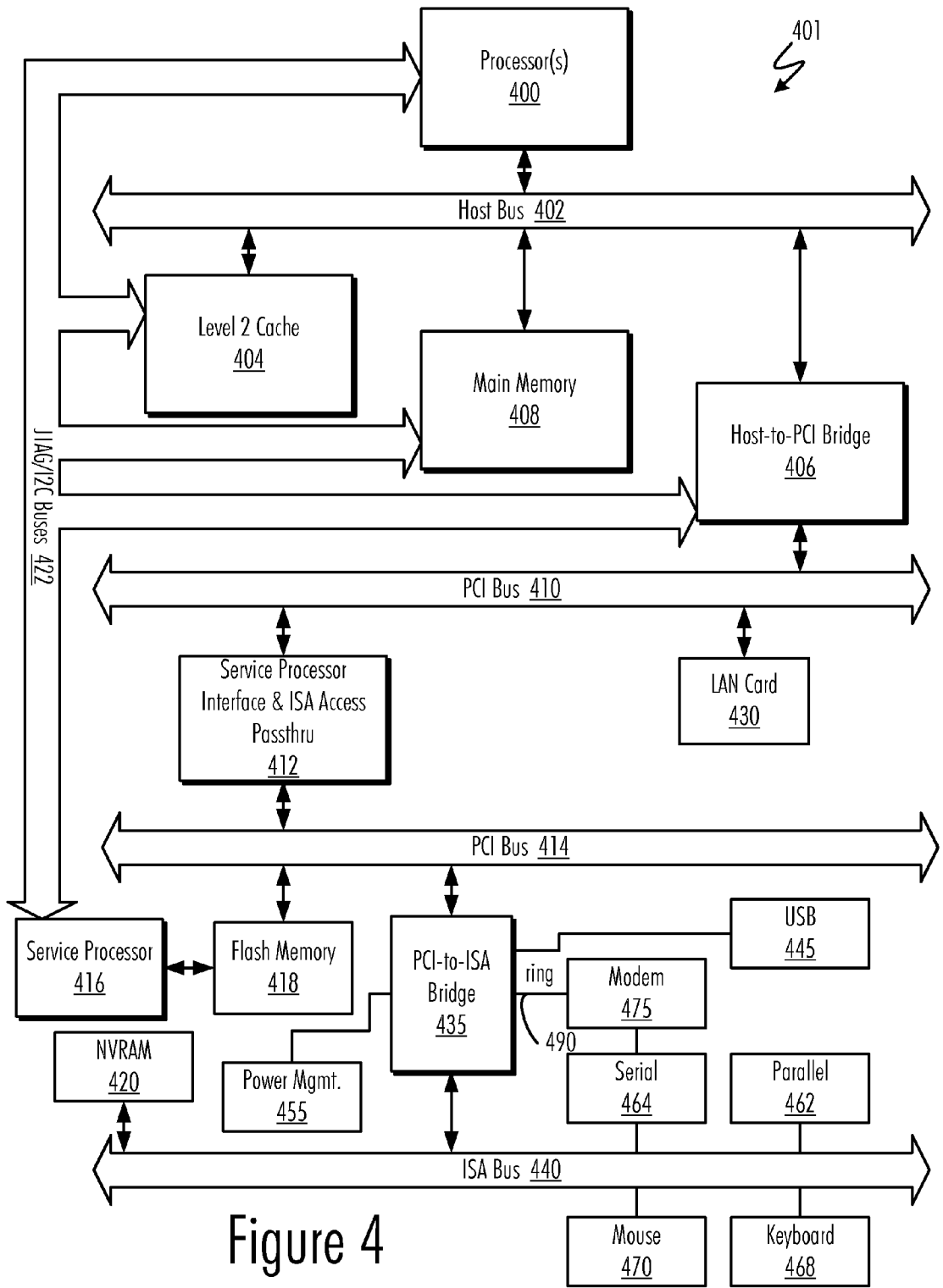
FIG. 4 is a block diagram of a data processing system in which a preferred embodiment of the present invention may be implemented.

FIG. 4 illustrates information handling system 401 which is a simplified example of a computer system/data processing system capable of performing the computing operations described herein with respect to a preferred embodiment of the present invention. Computer system 401 includes processor 400 which is coupled to host bus 402. A level two (L2) cache memory 404 is also coupled to host bus 402. Host-to-PCI bridge 406 is coupled to main memory 408, includes cache memory and main memory control functions, and provides bus control to handle transfers among PCI bus 410, processor 400, L2 cache 404, main memory 408, and host bus 402. Main memory 408 is coupled to Host-to-PCI bridge 406 as well as host bus 402. Devices used solely by host processor(s) 400, such as LAN card 430, are coupled to PCI bus 410. Service Processor Interface and ISA Access Pass-through 412 provides an interface between PCI bus 410 and PCI bus 414. In this manner, PCI bus 414 is insulated from PCI bus 410. Devices, such as flash memory 418, are coupled to PCI bus 414. In one implementation, flash memory 418 includes BIOS code that incorporates the necessary processor executable code for a variety of low-level system functions and system boot functions.

PCI bus 414 provides an interface for a variety of devices that are shared by host processor(s) 400 and Service Processor 416 including, for example, flash memory 418. PCI-to-ISA bridge 435 provides bus control to handle transfers between PCI bus 414 and ISA bus 440, universal serial bus (USB) functionality 445, power management functionality 455, and can include other functional elements not shown, such as a real-time clock (RTC), DMA control, interrupt support, and system management bus support. Nonvolatile RAM 420 is attached to ISA Bus 440. Service Processor 416 includes JTAG and I2C buses 422 for communication with processor(s) 400 during initialization steps. JTAG/I2C buses 422 are also coupled to L2 cache 404, Host-to-PCI bridge 406, and main memory 408 providing a communications path between the processor, the Service Processor, the L2 cache, the Host-to-PCI bridge, and the main memory. Service Processor 416 also has access to system power resources for powering down information handling device 401.

Peripheral devices and input/output (I/O) devices can be attached to various interfaces (e.g., parallel interface 462, serial interface 464, keyboard interface 468, and mouse interface 470 coupled to ISA bus 440. Alternatively, many I/O devices can be accommodated by a super I/O controller (not shown) attached to ISA bus 440.

In order to attach computer system 401 to another computer system to copy files over a network, LAN card 430 is coupled to PCI bus 410. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a computer readable storage medium, including a hard disk drive or a removable memory, such as an optical disk (for eventual use in a CD ROM) or floppy disk (for eventual use in a floppy disk drive), or the set of instructions may be downloaded via the Internet or other computer network. Thus, the present invention may be implemented as a computer program product with instructions stored on a computer readable storage medium for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A method in a data processing system having a local storage containing at least one electronic mailbox having one or more electronic mail messages, the method comprising:
   initiating a storage compaction operation to reduce the size of the at least one electronic mailbox, wherein the storage compaction operation replaces the one or more electronic mail messages of the at least one electronic mailbox with identifying information for locating and retrieving the one or more electronic mail messages;
   determining, for a particular message of the one or more electronic mail messages in a local mailbox of the at least one electronic mailbox maintained at the local storage, whether at least one copy of the particular message exists in a remote location outside of the local mailbox, wherein the remote location is not maintained by a mail server, wherein the determining further comprises:
      the data processing system invoking an internet search engine to locate the at least one copy of the particular message on an Internet, using, as a search query in the internet search engine, one or more statistically improbable words from the particular message;
   wherein the determining whether at least one copy of the particular message exists in a remote location further comprises:

invoking the internet search engine to locate the at least one copy of the particular message on the Internet, using, as a search query in the search engine, one or more phrases from the particular message;
identifying a potential copy of the particular message;
determining whether the potential copy is formatted differently than the particular message; and
in response to determining the potential copy is formatted differently than the particular message:
   determining whether a human-intended portion of content within the potential copy is the same as a human-intended portion of content within the particular message; and
   in response to determining the human-intended portion of content within the potential copy is the same as the human-intended portion of content within the particular message, identifying the potential copy as a copy of the particular message;
in response to a determination that the at least one copy of the particular message exists in the remote location, a processor of the data processing system replacing the particular message in the local mailbox with identifying information for locating and retrieving the at least one copy of the particular message from the remote location, wherein the identifying information comprises at least an address information of the remote location;
receiving a request for the particular message from a client system accessing the local mailbox;
in response to receiving the request for the particular message:
   determining whether the particular message has been replaced in the local mailbox with the identifying information;
   in response to determining that the particular message has been replaced in the local mailbox with the identifying information, retrieving a copy of the particular message by utilizing the identifying information to identify the remote location and retrieve the copy of the particular message from the remote location;
   comparing the located at least one copy with the particular message to determine if the at least one copy is a match to the particular message by applying an algorithm on the at least one copy that enables the processor to verify an integrity of the at least one copy of the particular message during subsequent retrieval of the at least one copy of the particular message from the remote location; and
   in response to receiving a request for the particular message and the identifying information comprising a Uniform Resource Locator (URL), accessing the URL on the Internet to retrieve the message content from a web page identified as located at the URL;
converting the copy of the particular message into an electronic mail message format; and
returning the retrieved copy of the particular message directly to the client system in fulfillment of the request.

2. The method of claim 1, wherein the at least one copy of the particular message is a web page that includes message content from the particular message, the method further comprising:
in response to a receiving a request at the local mailbox for the particular message:
   retrieving the message content from the web page;
   converting the message content from the web page into an electronic mail message format, wherein the converting further comprises appending mail protocol headers to the message content from the web page to enable processing of the message content as an ordinary electronic mail message; and
   in response to converting the message content from the webpage into an electronic mail message format, returning an electronic mail message containing the message content to the local mailbox in fulfillment of the request.

3. The method of claim 1, wherein the local storage is an electronic mail storage of an electronic mail server that maintains a plurality of mailboxes corresponding to respective client systems, including the local mailbox.

4. The method of claim 1,
wherein the identifying information further comprises an identifier that is hashed from the at least one copy of the particular message.

5. The method of claim 1, wherein:
the local storage stores messages within a plurality of mailboxes for a plurality of recipients of the particular message;
the particular message for at least one of the plurality of recipients is replaced within a respective local mailbox with the identifying information; and
the identifying information is shared among the at least one of the plurality of recipients.

6. The method of claim 1, further comprising:
applying a hash function to the at least one copy of the particular message located at the remote location to obtain a local hash value;
storing the local hash value within the identifying information at the local mailbox; and
in response to a subsequent request from a client to retrieve the copy of the particular message from the remote location:
   retrieving a present copy of the particular message from the remote location;
   retrieving a hash value of the present copy from the remote location;
   comparing the hash value of the present copy with the local hash value stored at the local mailbox; and
   in response the comparison not resulting in a match, returning a message to the client indicating that the particular message is not available.

7. The method of claim 1, further comprising:
determining if the particular message was received via an electronic mail mailing list that maintains an archive of one or more messages of the electronic mail mailing list, including the particular message, at a particular location on the Internet;
wherein the replacing the particular message with identifying information further comprises replacing the locally-stored message with the location of one of (a) the archive and (b) the message as stored in the archive.

8. The method of claim 1, further comprising:
replacing the local mailbox with a compacted mailbox which contains identifying information for each of the one or more electronic mail messages having at least one copy in a remote location, wherein the identifying information is stored in the compacted mailbox; and
periodically performing the storage compaction operation on the at least one electronic mailbox.

9. A computer program product comprising a computer readable storage device having functional descriptive material stored thereon that, when executed by a computer having at least one electronic mailbox containing a plurality of electronic mail messages, causes the computer to perform actions that include:

initiating a storage compaction operation to reduce the size of the at least one electronic mailbox, wherein the storage compaction operation replaces the one or more electronic mail messages of the at least one electronic mailbox with identifying information for locating and retrieving the one or more electronic mail messages;

determining, for a particular message of the one or more electronic mail messages stored in a local mailbox of the at least one electronic mailbox, whether at least one copy of the particular message exists in a remote location outside of the local mailbox, wherein the remote location is not maintained by a mail server, wherein the determining further comprises:

invoking an internet search engine to locate the at least one copy of the particular message on an Internet, using, as a search query in the internet search engine, one or more statistically improbable words from the particular message;

identifying a potential copy of the particular message;

determining whether the potential copy is formatted differently than the particular message; and in response to determining the potential copy is formatted differently than the particular message:

determining whether a human-intended portion of content within the potential copy is the same as a human-intended portion of content within the particular message; and in response to determining the human-intended portion of content within the potential copy is the same as the human-intended portion of content within the particular message, identifying the potential copy as a copy of the particular message;

in response to a determination that the at least one copy of the particular message exists in the remote location, replacing the particular message within the local mailbox with identifying information for locating, confirming and retrieving the at least one copy of the particular message from the remote location, wherein the identifying information comprises at least address information of the remote location;

receiving a request for the particular message from a client system accessing the local mailbox;

in response to receiving the request for the particular message:

determining whether the particular message has been replaced in the local mailbox with the identifying information;

in response to determining that the particular message has been replaced in the local mailbox with the identifying information, retrieving a copy of the particular message by utilizing the identifying information to identify the remote location and retrieve the copy of the particular message from the remote location;

converting the copy of the particular message into an electronic mail message format;

returning the retrieved copy of the particular message directly to the client system in fulfillment of the request;

comparing the located at least one copy with the particular message to determine if the at least one copy is a match to the particular message by applying an algorithm on the at least one copy that enables the processor to verify an integrity of the at least one copy of the particular message during subsequent retrieval of the at least one copy of the particular message from the remote location; and in response to receiving a request for the particular message and the identifying information comprising a Uniform Resource Locator (URL), accessing the URL on the Internet to retrieve the message content from a web page identified as located at the URL.

10. The computer program product of claim 9, wherein the at least one copy of the particular message is a web page that includes message content from the particular message, the computer program product further comprising additional functional descriptive material that causes the computer to perform the actions of:

in response to a request received at the local mailbox for the particular message:

retrieving the message content from the web page;

converting the message content from the web page into an electronic mail message format, wherein the converting further comprises appending mail protocol headers to the message content from the web page to enable processing of the message content as an ordinary electronic mail message; and in response to converting the message content from the webpage into an electronic mail message format, returning an electronic mail message containing the message content to the local mailbox in fulfillment of the request.

11. The computer program product of claim 9, wherein the local storage is an electronic mail storage of an electronic mail server that maintains a plurality of mailboxes corresponding to respective client systems, including the local mailbox.

12. The computer program product of claim 9, wherein the determining includes:

invoking the internet search engine to locate the at least one copy of the particular message on the Internet, using, as a search query in the search engine, one or more phrases from the particular message; and wherein the identifying information further comprises an identifier that is hashed from the at least one copy of the particular message;

wherein the local storage stores messages within a plurality of mailboxes for a plurality of recipients of the particular message;

wherein the particular message for at least one of the plurality of recipients is replaced within a respective local mailbox with the identifying information; and wherein the identifying information is shared among the at least one of the plurality of recipients.

13. The computer program product of claim 11, further comprising additional functional descriptive material that, when executed by a computer, causes the computer to perform actions of:

applying a hash function to the at least one copy to obtain a local hash value;

storing the hash value within the identifying information; and in response to a subsequent request from a client to retrieve the copy of the particular message from the remote location:

retrieving a present copy of the particular message from the remote location;

retrieving a hash value of the present copy from the remote location;

comparing the hash value of the present copy with the local hash value stored at the local mailbox; and in response the comparison not resulting in a match, returning a message to the client indicating that the particular message is not available.

14. The computer program product of claim 11, comprising additional functional descriptive material that, when executed by a computer, causes the computer to perform actions of:
- determining if the particular message was received via an electronic mail mailing list that maintains an archive of one or more messages of the electronic mail mailing list, including the particular message, at a particular location on the Internet;
- wherein the functional descriptive material for replacing the particular message with identifying information further comprises functional descriptive material for the replacing the locally-stored message with the location of one of (a) the archive and (b) the message as stored in the archive.

15. The computer program product of claim 9, further comprising additional functional descriptive material that, when executed by a computer, causes the computer to perform actions of:
- periodically performing the storage compaction operation on the at least one electronic mailbox; and
- replacing the local mailbox with a compacted mailbox which contains identifying information for each of the one or more electronic mail messages having at least one copy in a remote location, wherein the identifying information is stored in the compacted mailbox.

16. A data processing system comprising:
- at least one processor;
- a memory coupled to the at least one processor;
- data storage accessible to the at least one processor;
- at least one electronic mailbox in the data storage, wherein the at least one electronic mailbox stores multiple electronic mail messages; and
- a set of instructions in the data storage executing on the at least one processor that:
  - initiates a storage compaction operation to reduce the size of the at least one electronic mailbox, wherein the storage compaction operation replaces the one or more electronic mail messages of the at least one electronic mailbox with identifying information for locating and retrieving the one or more electronic mail messages;
  - determines, for a particular message of the one or more electronic mail messages contained within a local mailbox of the at least one electronic mailbox, whether at least one copy of the particular message exists at the remote location that is outside of the local mailbox, wherein the remote location is not maintained by a mail server; and
  - invokes an internet search engine to locate the at least one copy of the particular message on an Internet, using, as a search query in the internet search engine, one or more statistically improbable words from the particular message;
  - identifies a potential copy of a particular message;
  - determines whether the potential copy is formatted differently than the particular message;
  - in response to determining the potential copy is formatted differently than the particular message:
    - determines whether a human-intended portion of content within the potential copy is the same as a human-intended portion of content within the particular message; and
    - in response to determining the human-intended portion of content within the potential copy is the same as the human-intended portion of content within the particular message, identifies the potential copy as a copy of the particular message; and
  - in response to a determination that at least one copy of the particular message exists in the remote location, replaces the particular message within the local mailbox with identifying information for locating and retrieving the at least one copy of the particular message from the remote location, wherein the identifying information comprises at least an address information of the remote location;
  - receives a request for the particular message from a client system accessing the local mailbox;
  - in response to receiving the request for the particular message:
    - determines whether the particular message has been replaced in the local mailbox with the identifying information;
    - in response to determining that the particular message has been replaced in the local mailbox with the identifying information, retrieves a copy of the particular message by utilizing the identifying information to identify the remote location and retrieve the copy of the particular message from the remote location;
    - compares the located at least one copy with the particular message to determine if the at least one copy is a match to the particular message by applying an algorithm on the at least one copy that enables the processor to verify an integrity of the at least one copy of the particular message during subsequent retrieval of the at least one copy of the particular message from the remote location; and
    - in response to receiving a request for the particular message and the identifying information comprising a Uniform Resource Locator (URL), accesses the URL on the Internet to retrieve the message content from a web page identified as located at the URL.

17. The data processing system of claim 16, wherein: the local storage is an electronic mail storage of an electronic mail server that maintains a plurality of mailboxes corresponding to respective mail clients, including the local mailbox, the identifying information comprises a Uniform Resource Locator (URL) corresponding to an address of the remote location, and the processor executes additional instructions that:
- in response to receiving the request for the particular message:
  - converts the copy of the particular message into an electronic mail message format, wherein the converting further comprises appending mail protocol headers to the message content from the web page to enable processing of the message content as an ordinary electronic mail message; and
  - in response to converting the message content from the webpage into an electronic mail message format, returns an electronic mail message containing the message content in fulfillment of the request;
- wherein the identifying information further comprises an identifier that is hashed from the at least one copy of the particular message;
- wherein the local storage stores messages within a plurality of mailboxes for a plurality of recipients of the particular message;
- wherein the particular message for at least one of the plurality of recipients is replaced within a respective local mailbox with the identifying information; and wherein the identifying information is shared among the at least one of the plurality of recipients.

18. The data processing system of claim 17, wherein the at least one processor executes additional instructions that causes the data processing system to:
apply a hash function to the at least one copy to obtain a local hash value;
store the hash value within the identifying information; and
in response to a subsequent request from a client to retrieve the copy of the particular message from the remote location:
retrieve a present copy of the particular message from the remote location; retrieve a hash value of the present copy from the remote location;
compare the hash value of the present copy with the local hash value stored at the local mailbox; and
in response the comparison not resulting in a match, returns a message to the client indicating that the particular message is not available.

19. The data processing system of claim 16, wherein the at least one processor executes additional instructions that:
periodically performs the storage compaction operation on the at least one electronic mailbox; and
replaces the local mailbox with a compacted mailbox which contains identifying information for each of the one or more electronic mail messages having at least one copy in a remote location, wherein the identifying information is stored in the compacted mailbox;
determining if the particular message originated from an electronic mail mailing list that maintains an archive of one or more messages of the electronic mail mailing list, including the particular message, at a particular location on the Internet; and
wherein replacing the particular message includes replacing the particular message with a location of one of (a) the archive and (b) the particular message as stored in the archive.

* * * * *